(12) United States Patent
Kurokawa et al.

(10) Patent No.: US 12,467,782 B2
(45) Date of Patent: Nov. 11, 2025

(54) WINDOW MEMBER, METHOD FOR MANUFACTURING WINDOW MEMBER, AND ELECTRONIC DEVICE

(71) Applicant: Casio Computer Co., Ltd., Tokyo (JP)

(72) Inventors: Tomoyasu Kurokawa, Kokubunji (JP); Toshiya Yuki, Higashine (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 576 days.

(21) Appl. No.: 17/636,766

(22) PCT Filed: Jul. 29, 2020

(86) PCT No.: PCT/JP2020/029909
§ 371 (c)(1),
(2) Date: Feb. 18, 2022

(87) PCT Pub. No.: WO2021/033540
PCT Pub. Date: Feb. 25, 2021

(65) Prior Publication Data
US 2022/0299360 A1 Sep. 22, 2022

(30) Foreign Application Priority Data
Aug. 19, 2019 (JP) .................................. 2019-150016

(51) Int. Cl.
*A61B 5/1455* (2006.01)
*G01J 1/04* (2006.01)
*A61B 5/024* (2006.01)

(52) U.S. Cl.
CPC ............. *G01J 1/04* (2013.01); *A61B 5/02438* (2013.01)

(58) Field of Classification Search
CPC ... A61B 5/02438; A61B 5/026; A61B 5/0285; H01L 27/1464; H01L 27/14623
(Continued)

(56) References Cited

U.S. PATENT DOCUMENTS 5,634,846 A * 6/1997 Lee ........................... F24F 11/77
250/221
7,026,654 B2 4/2006 Igaki et al.
(Continued)

FOREIGN PATENT DOCUMENTS

| CN | 106793966 A | 5/2017 |
| JP | 57-93039 A | 6/1982 |

(Continued)

OTHER PUBLICATIONS

Chinese Office Action dated May 30, 2023, for the corresponding Chinese Patent Application No. 202080058093.7, 53 pages. (With English Translation).
(Continued)

*Primary Examiner* — Audrey Y Chang
(74) *Attorney, Agent, or Firm* — Seed Intellectual Property Law Group LLP

(57) ABSTRACT

A window member including a light transmissive resin plate having a partition groove provided in a thickness direction in at least part of an outer peripheral portion of a predetermined area; and a light blocking section embedded in the partition groove and fixed to the resin plate by having a welded section at part of an interface in the partition groove.

14 Claims, 10 Drawing Sheets

(58) Field of Classification Search
USPC .......................................................... 600/355
See application file for complete search history.

(56) References Cited

U.S. PATENT DOCUMENTS

| | | | |
|---|---|---|---|
| 8,352,003 B2 | 1/2013 | Sawada et al. | |
| 9,439,569 B2 | 9/2016 | Shimuta | |
| 9,613,939 B2 | 4/2017 | Rossi et al. | |
| 10,111,592 B2 | 10/2018 | Shimuta | |
| 10,702,211 B2 | 7/2020 | Clavelle et al. | |
| 2003/0189213 A1 | 10/2003 | Igaki et al. | |
| 2008/0097172 A1 | 4/2008 | Sawada et al. | |
| 2013/0137994 A1 | 5/2013 | Sawada et al. | |
| 2013/0154136 A1* | 6/2013 | Kim | B29D 11/0074 425/123 |
| 2014/0091378 A1* | 4/2014 | Hashimoto | H01L 27/14623 257/294 |
| 2014/0151586 A1 | 6/2014 | Shimuta | |
| 2015/0340351 A1 | 11/2015 | Rossi et al. | |
| 2016/0235310 A1 | 8/2016 | Shimuta | |
| 2017/0008564 A1* | 1/2017 | Nam | F16B 23/00 |
| 2017/0224218 A1* | 8/2017 | Tanaka | A61B 5/02438 |
| 2018/0014781 A1 | 1/2018 | Clavelle et al. | |
| 2018/0360352 A1* | 12/2018 | Ohno | A61B 5/1455 |
| 2019/0252439 A1* | 8/2019 | Ogawa | H01L 27/1464 |
| 2020/0305794 A1 | 10/2020 | Clavelle et al. | |

FOREIGN PATENT DOCUMENTS

| | | | |
|---|---|---|---|
| JP | 8-252213 A | | 10/1996 |
| JP | 2001-250979 A | | 9/2001 |
| JP | 3467110 B2 | | 11/2003 |
| JP | 2004-6753 A | | 1/2004 |
| JP | 2006-130208 A | | 5/2006 |
| JP | 4061409 B2 | | 3/2008 |
| JP | 2009291389 A | | 12/2009 |
| JP | 2013-88760 A | | 5/2013 |
| JP | 2013/027357 A1 | | 3/2015 |
| JP | 5692389 B2 | | 4/2015 |
| JP | 5740282 B2 | | 6/2015 |
| JP | 2016-47105 A | | 4/2016 |
| JP | 2016-86873 A | | 5/2016 |
| JP | 2016123472 A | | 7/2016 |
| JP | 2018-7887 A | | 1/2018 |
| JP | 2017/094089 A1 | | 9/2018 |
| JP | 6476656 B2 | | 3/2019 |
| JP | 2019-150016 A | | 9/2019 |
| JP | 6616069 B2 | | 12/2019 |
| JP | 6666359 B2 | | 3/2020 |
| WO | 2013/027357 A1 | | 2/2013 |
| WO | 2017/094089 A1 | | 6/2017 |

OTHER PUBLICATIONS

International Search Report, mailed Oct. 20, 2020, for International Application No. PCT/JP2020/029909. (8 pages including translation).

Japanese Notice of Reasons for Refusal dated Sep. 5, 2023, for the corresponding Japanese Patent Application No. 2019-150016, 12 pages. (With English Translation).

* cited by examiner

WINDOW MEMBER, METHOD FOR MANUFACTURING WINDOW MEMBER, AND ELECTRONIC DEVICE

CROSS REFERENCE TO RELATED APPLICATIONS

This is a U.S. National Phase application of International Application No. PCT/JP2020/029909, filed Jul. 29, 2020, which is based on and claims priority from Japanese Patent Application No. 2019-150016, filed on Aug. 19, 2019, the entire contents of both of which are incorporated herein by reference.

TECHNICAL FIELD

The present invention relates to a window member that is used for electronic devices such as arm wearable electronic devices and portable communication devices, a method for manufacturing the window member, and an electronic device provided with the window member.

BACKGROUND ART

For example, an arm wearable electronic device is known which is equipped with a pulse sensor that measures a pulse by irradiating an arm with light from a light emitting element and receiving reflected light by a light receiving element, as described in Patent Document 1.

PRIOR ART DOCUMENT

Patent Document

Patent Document 1: JP 2018-7887

SUMMARY OF INVENTION

Problem to be Solved by the Invention

When a pulse is to be measured by the pulse sensor of this arm wearable electronic device, it is required that the light emitting element emits light, an arm is irradiated with the emitted light through a transparent window member, and the light receiving element receives reflected light resulting from the emitted light through the transparent window member.

However, in this type of arm wearable electronic device, part of the light emitted by the light emitting element does not pass through the transparent window member and is directly emitted to the light receiving element. Accordingly, it is impossible for the light receiving element to receive only reflected light derived by the light from the light emitting element reflecting on the arm and passing through the window member. Thus, pulse measurement thereby is not accurate.

For this reason, for this type of arm wearable electronic device, a structure has been conceived in which a partition groove is formed in an outer peripheral portion of a predetermined part of the transparent window member corresponding to the light receiving element, and a light blocking section is embedded in the partition groove so as to block light from areas other than a predetermined area. However, this structure has a problem in that merely embedding the light blocking section in the partition groove is not enough in terms of acquiring a sufficient fixing strength and ensuring waterproofness.

An object of the present invention is to provide a window member by which part of light emitted from a light emitting element, which may be directly emitted to a light receiving element, is blocked with a light blocking section being firmly fixed to ensure waterproofness, a method for manufacturing the window member, and an electronic device provided with the window member.

Means for Solving the Problem

An embodiment of the present invention is a window member comprising: a light transmissive resin plate having a partition groove provided in a thickness direction in at least part of an outer peripheral portion of a predetermined area; and a light blocking section embedded in the partition groove and fixed to the resin plate by having a welded section at part of an interface in the partition groove.

Another embodiment of the present invention is a window member comprising: a first area corresponding to a light receiving element; a second area corresponding to a light emitting element; a light transmissive resin plate having a partition groove provided in a thickness direction at a position between an outer peripheral portion of the first area corresponding to a light receiving section of the light receiving element and an outer peripheral portion of the second area corresponding to the light emitting element; and a light blocking section embedded in the partition groove and fixed to the resin plate by having a welded section at part of an interface in the partition groove.

Another embodiment of the present invention is a window member manufacturing method comprising: a first step of molding, by a primary molding die, a light transmissive resin plate having a partition groove provided in a thickness direction in at least part of an outer peripheral portion of a predetermined area; and a second step of embedding a light blocking section in the partition groove, and fixing the light blocking section to the resin plate by forming a welded section at part of an interface between the light blocking section and the resin plate in the partition groove, by a secondary molding die.

BRIEF DESCRIPTION OF DRAWINGS

FIG. 7 is a diagram showing cross-sections of the window member shown in FIG. 6, in which

FIG. 9 is a diagram showing cross-sections of the primary molding die shown in FIG. 8, in which FIG. 10 is a diagram showing cross-sections of a secondary molding die for performing second molding on a primary molded article molded by the primary molding die shown in FIG. 9, in which

DESCRIPTION OF EMBODIMENTS

An embodiment where the present invention has been applied in an arm wearable electronic device will hereinafter be described with reference to FIG. 1 to FIG. 10.

Figure 1:
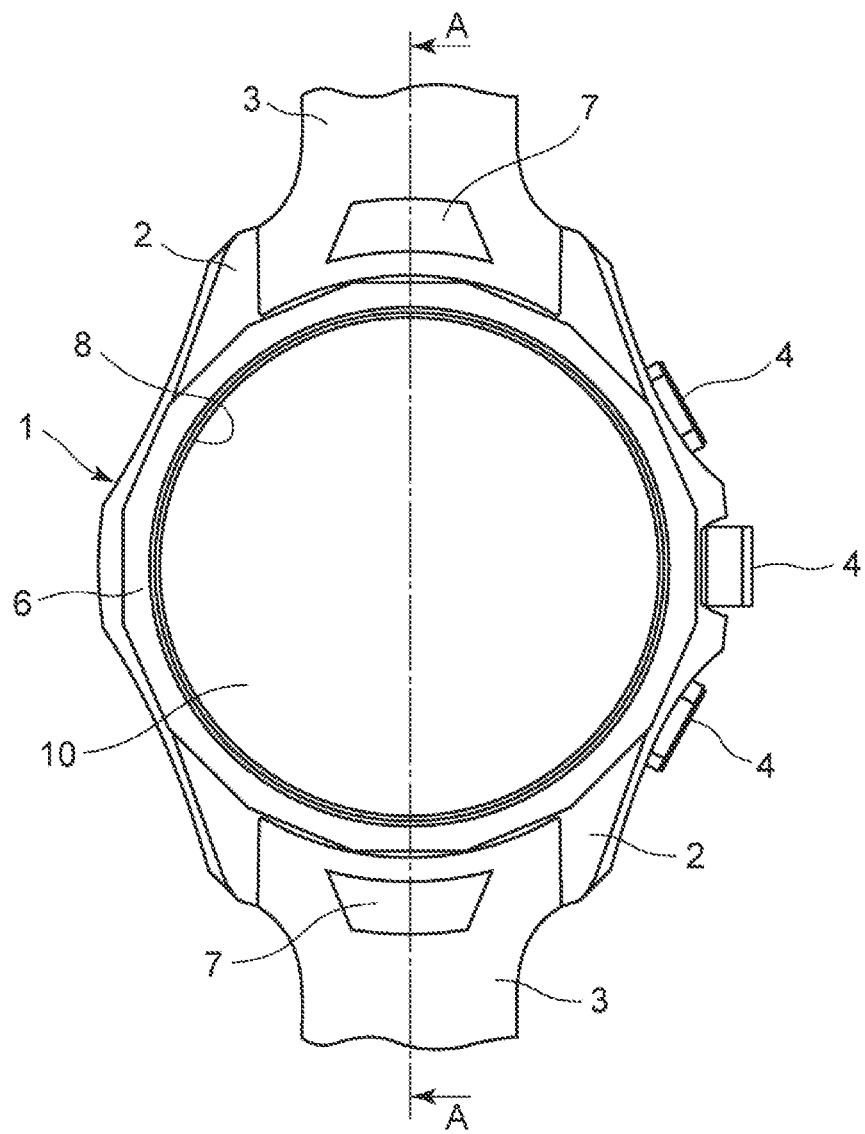
FIG. 1 is an enlarged front view of an embodiment where the present invention has been applied in an arm wearable electronic device.

This electronic device, which is a wearable device, is an arm wearable information terminal that is used with it being worn on an arm, and includes a device case 1, as shown in FIG. 1.

Figure 2:
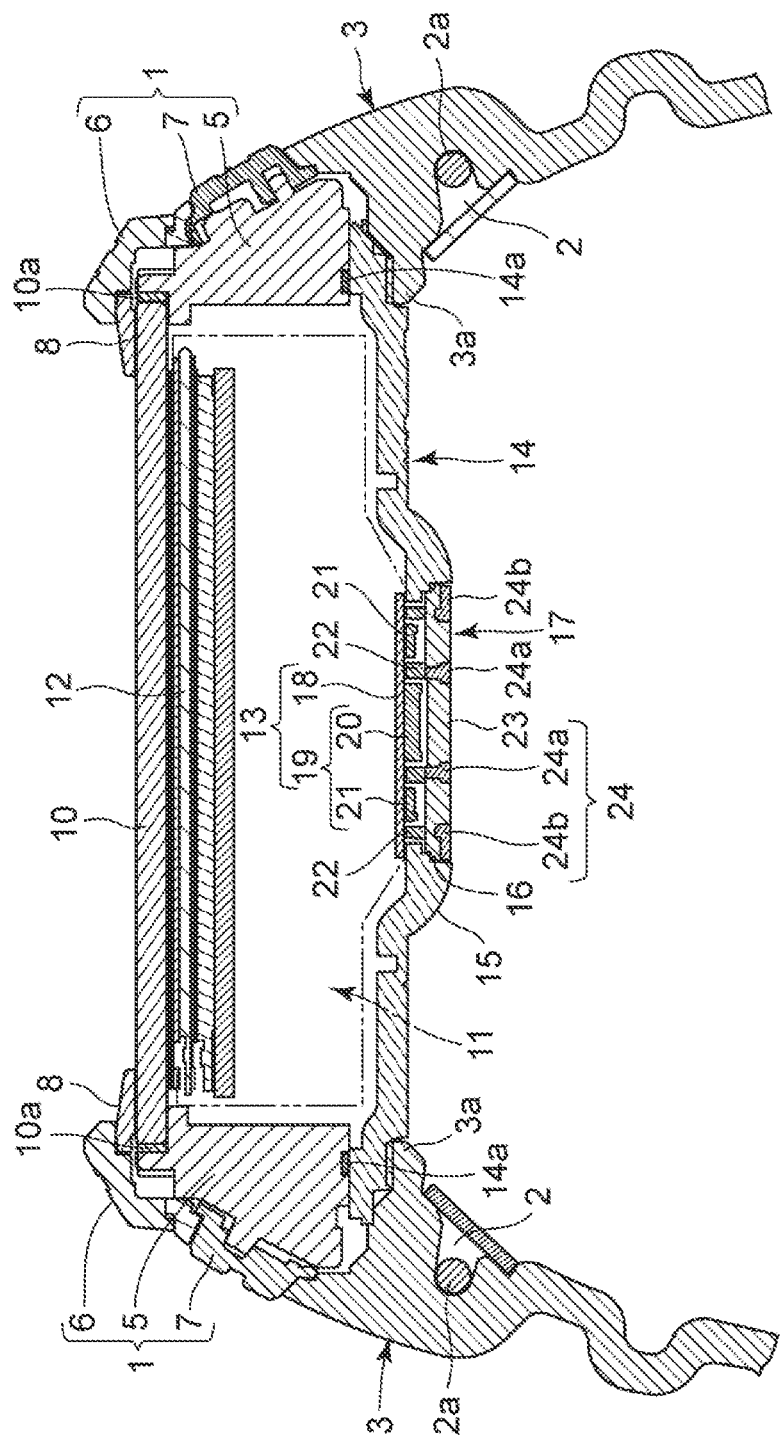
FIG. 2 is an enlarged sectional view of the arm wearable electronic device taken along the A-A arrow view shown in FIG. 1.

On the 12 o'clock side and 6 o'clock side of this device case 1, band attachment sections 2 are provided, as shown in FIG. 1 and FIG. 2. These band attachment sections 2 are structured such that wristbands 3 are attached thereto by pin components 2*a*. Also, on the 2 o'clock side, 3 o'clock side, and 4 o'clock side of the device case 1, push button switches 4 are provided.

This device case 1 includes a case main body 5 that is small enough to be worn on an arm, and first and second exterior members 6 and 7 which are provided around the outer circumference of the case main body 5, as shown in FIG. 1 and FIG. 2. The case main body 5 is formed of metal or a hard synthetic resin. Also, the first exterior member 6 is a bezel formed of metal or synthetic resin, and is attached to the upper outer circumferential portion of the case main body 5 via a ring-shaped parting member 8. The second exterior members 7 are decorative pieces formed of metal or synthetic resin, and are attached to outer circumferential portions of the case main body 5 corresponding to the wristbands 3.

To the upper opening of the device case 1, that is, to the upper opening of the case main body 5, a transparent cover glass 10 is attached via a packing 10*a*, as shown in FIG. 1 and FIG. 2. In this embodiment, on the outer circumferential portion of the upper surface of this transparent cover glass 10, the parting member 8 is arranged. The outer circumferential portion of this parting member 8 is pressed against the transparent cover glass 10 by the first exterior member 6.

In the device case 1, that is, in the case main body 5, a module 11 is arranged, as shown in FIG. 2. Although not shown in the drawing, this module 11 includes, in addition to a display device 12 which displays information and a later-described pulse measurement device 13 which measures pulses, a circuit board which drives and controls these devices, and various types of components such as a communication section required for wireless communication and a battery.

The display device 12 includes a flat-surface type display panel such as a liquid crystal display panel and an EL (Electro-Luminescence) display panel, and is provided under the transparent cover glass 10, as shown in FIG. 2. As a result, the display device 12 is structured such that each type of information, such as time information indicating clock time and a date, communication information, and a pulse measurement result, is electronically displayed thereon and this displayed information is viewed from the outside of the device case 1 through the transparent cover glass 10.

Also, to the lower part of the device case 1, that is, to the lower part of the case main body 5, a back cover 14 is attached via a waterproof ring 14*a*, as shown in FIG. 2. This back cover 14, which is formed of a metal such as stainless steel, is structured to be pressed against the skin T of an arm (refer to FIG. 4) when the device case 1 is worn on the arm. In this embodiment, the undersurfaces of outer circumferential portions of the back cover 14 on the 12 o'clock side and the 6 o'clock side are pressed from below by pressing sections 3*a* of the wristbands 3.

Figure 3:
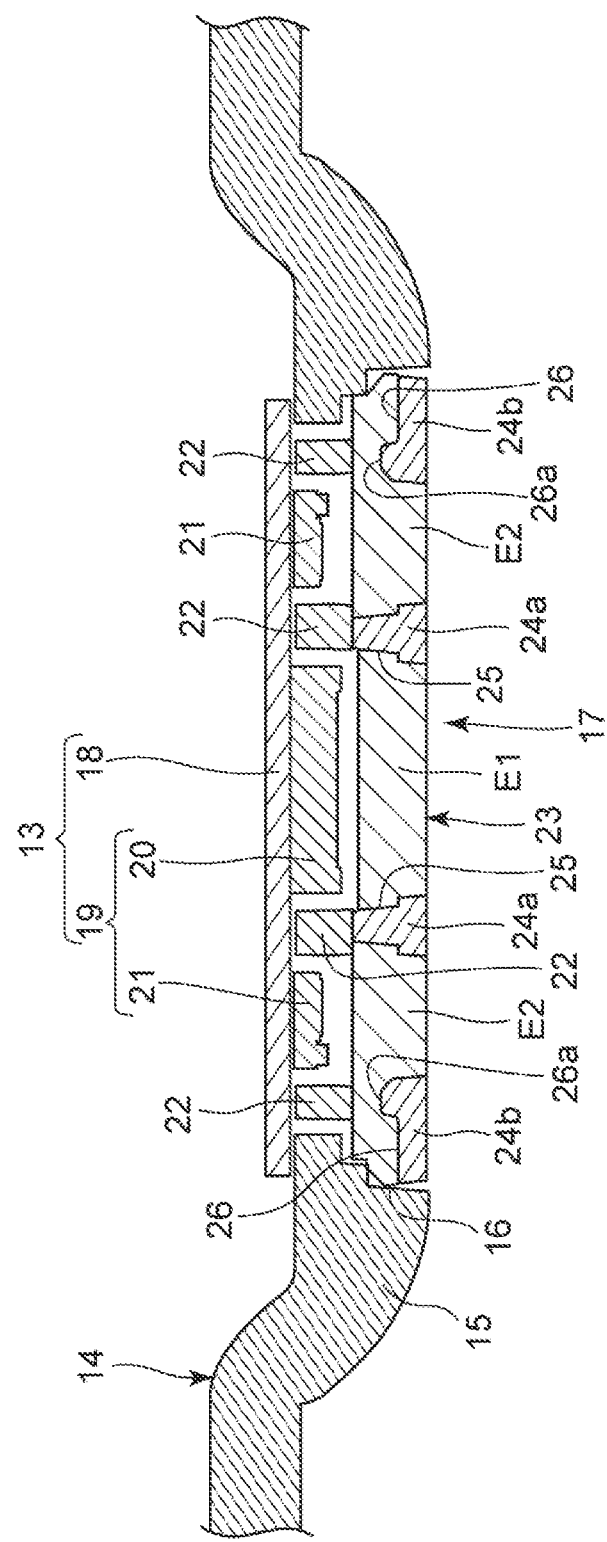
FIG. 3 is an enlarged sectional view of a main portion of the arm wearable electronic device shown in FIG. 2.

On the center of the back cover 14, a circular projection section 15 is formed projecting downward, as shown in FIG. 2 and FIG. 3. In this circular projection section 15, a circular opening section 16 whose outer diameter is shorter than that of the circular projection section 15 is provided. The inner circumferential portion of the opening section 16 is formed in a step-like shape such that its outer surface side (lower surface side in FIG. 3) is wider than its inner surface side (upper surface side in FIG. 3). Also, the outer surface side of the step-like portion of the opening section 16 has a later-described window member 17 fitted thereinto. On the inner surface of the back cover 14, the pulse measurement device 13 is provided corresponding to the opening section 16.

The pulse measurement device 13 includes a sensor board 18 and a pulse sensor 19, as shown in FIG. 2 and FIG. 3. The sensor board 18 is formed in a discoid shape whose outer diameter is longer than the inner diameter of the opening section 16, and is provided on the inner surface of the back cover 14 while covering the opening section 16. This sensor board 18 is electrically connected to the circuit board (not shown) of the module 11 by a connecting member (not shown).

Figure 4:
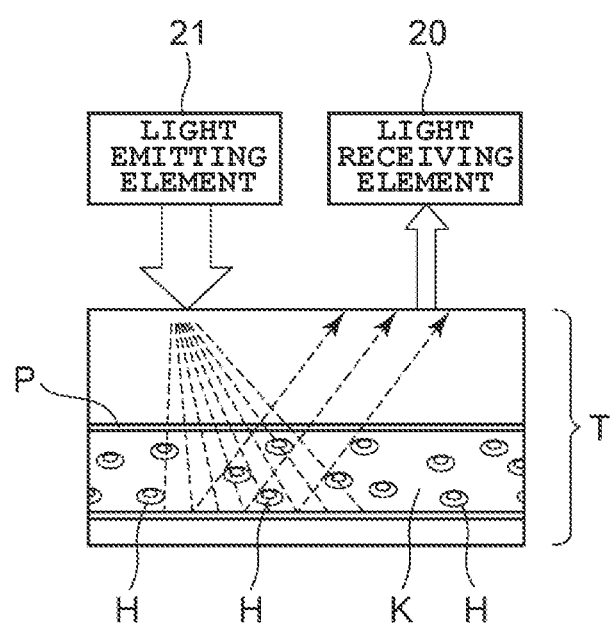
FIG. 4 is a diagram showing the principle of pulse measurement by a pulse sensor shown in FIG. 3.

The pulse sensor 19, which includes a light receiving element 20 and a plurality of light emitting elements 21 provided on the undersurface of the sensor board 18, is structured to be inserted into the opening section 16 and arranged on the inner surface side (upper surface side in FIG. 3) of the step-like portion, as shown in FIG. 2 and FIG. 3. The plurality of light emitting elements 21 is light emitting diodes which emit green light that is readily absorbed by hemoglobin H in blood K existing within the light emission ranges of these light emitting elements 21, such as light with a wavelength of 520 nm to 530 nm, as shown in FIG. 4. These light emitting elements 21 are arranged corresponding to the outer circumference of the light receiving element 20, as shown in FIG. 5.

On the other hand, the light receiving element 20, which is a photo diode that receives light and outputs it as an electric signal, is structured to receive reflected light resulting from light emitted on an arm by the plurality of light emitting elements 21, and output electric energy corresponding to the light receiving amount as an electric signal, as shown in FIG. 4. In the example in the present embodiment, the light receiving element 20 is formed in a substantially square shape whose one corner has been cut off, and is structured such that light receiving sections 20*a* are provided on the sides of the substantially square shape excluding one side, that is, three sides among the four sides of the substantially square shape, as shown in FIG. 5.

Figure 5:
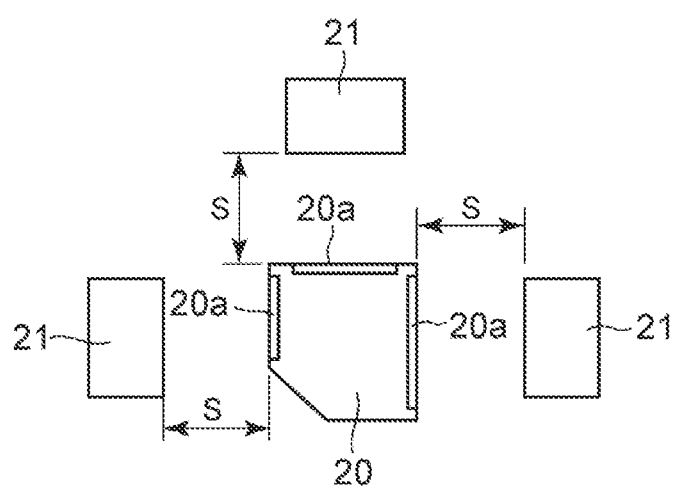
FIG. 5 is an enlarged planar view showing a positional relation of a plurality of light emitting elements with respect to a light receiving element in the pulse sensor shown in FIG. 3.

As a result, the plurality of light emitting elements 21 is provided on the sensor board 18 such that these light emitting elements 21 and the light receiving sections 20a on the three sides of the light receiving element 20 are arranged at predetermined intervals S, as shown in FIG. 5. Consequently, the light receiving element 20 is structured such that, by the plurality of light emitting elements 21 and the light receiving sections 20a on the three sides being arranged at the predetermined intervals S, the light receiving rates of the light receiving sections 20a when reflected light resulting from light emitted on an arm by the plurality of light emitting elements 21 is received by the light receiving sections 20a are equalized.

In this embodiment, on the undersurface of the sensor board 18, a plurality of partitions 22 are provided between each light emitting element 21 and the light receiving element 20 and around the outer peripheries of these light emitting elements 21, as shown in FIG. 2 and FIG. 3. These partitions 22 are light shielding walls for regulating the emission range of light emitted from the plurality of light emitting elements 21 and the incident range of the light receiving element 20.

That is, these partitions 22 are structured to prevent the light receiving element 20 from being directly irradiated with light emitted by the plurality of light emitting elements 21, as shown in FIG. 2 and FIG. 3. In this embodiment, each partition 22 is formed such that its vertical length from the undersurface of the sensor board 18 is slightly longer than the thicknesses of the light receiving element 20 and the plurality of light emitting elements 21. Consequently, each partition 22 protrudes lower than the light receiving element 20 and the plurality of light emitting elements 21.

As a result, the pulse sensor 19 is formed such that, when the sensor board 18 is arranged on the inner surface of the back cover 14 and the light receiving element 20 and the plurality of light emitting elements 21 are inserted into the inner surface side (upper surface side in FIG. 3) of the step-like portion of the opening section 16, the partitions 22 are brought into contact with the inner surface of the window member 17, whereby the light receiving element 20 and the plurality of light emitting elements 21 do not come in contact with the inner surface of the window member 17, as shown in FIG. 2 and FIG. 3.

The window member 17 is to cover and seal the opening section 16 provided in the projection section 15 of the back cover 14, and includes a light transmissive resin plate 23, as shown in FIG. 2 and FIG. 3. This resin plate 23 is formed of a transparent or translucent synthetic resin such as acrylic resin (PMMA), polycarbonate resin (PC), and ABS resin, and has a discoid shape.

Also, this resin plate 23 having the discoid shape is formed such that its outer diameter is equal to the inner diameter of the outer surface side (lower surface side in FIG. 3) of the step-like portion located on the inner circumferential portion of the opening section 16 of the back cover 14, as shown in FIG. 2 and FIG. 3. This resin plate 23 is fitted into the outer surface side of the step-like portion located on the inner circumferential portion of the opening section 16, and adhered in this state to the inner circumferential portion of the opening section 16 by ultrasonic welding.

Figure 6:
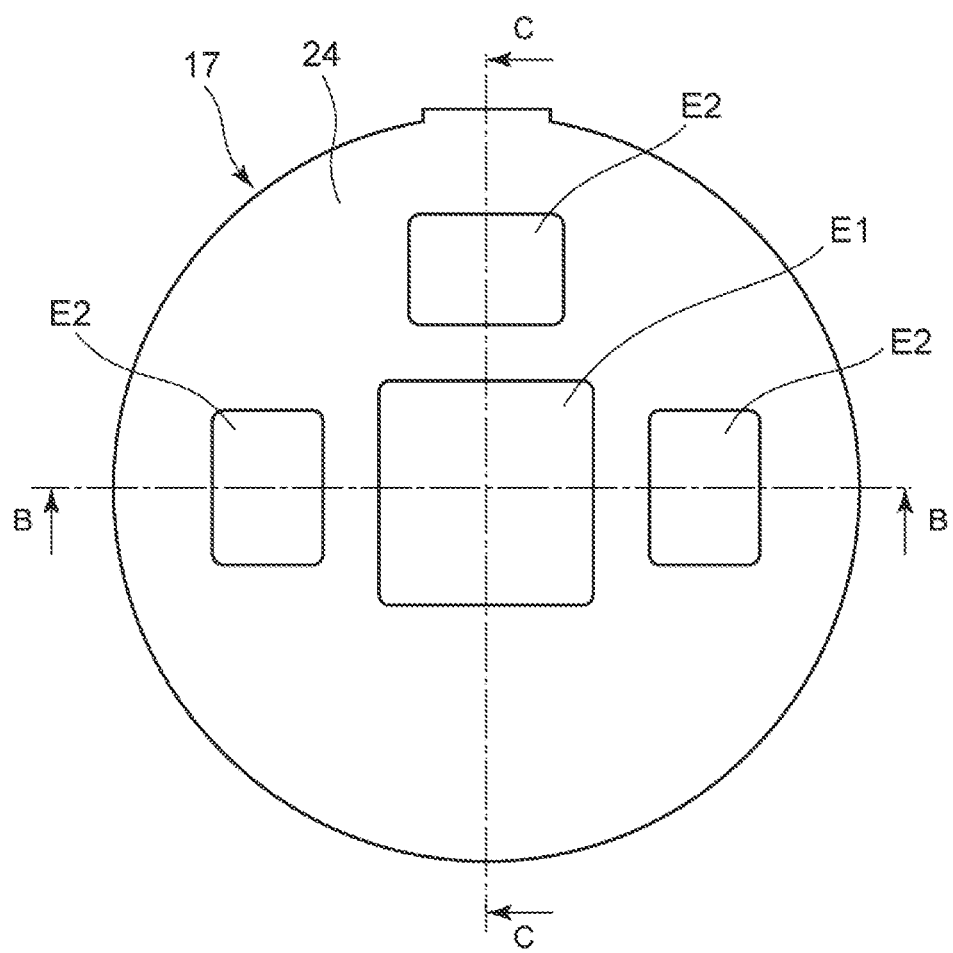
FIG. 6 is an enlarged front view showing the undersurface side of a window member shown in FIG. 3.

In the resin plate 23, a first light transmission area E1, a plurality of second light transmission areas E2, and a light blocking section 24 are provided, as shown in FIG. 6. The first light transmission area E1 is provided corresponding to the light receiving element 20, and the plurality of second light transmission areas E2 are provided corresponding to the plurality of light emitting elements 21. The light blocking section 24 is embedded in a partition groove 25 and a partition recess section 26 which are provided in the resin plate 23 excluding the first and the second light transmission areas E1 and E2.

Figure 7A:
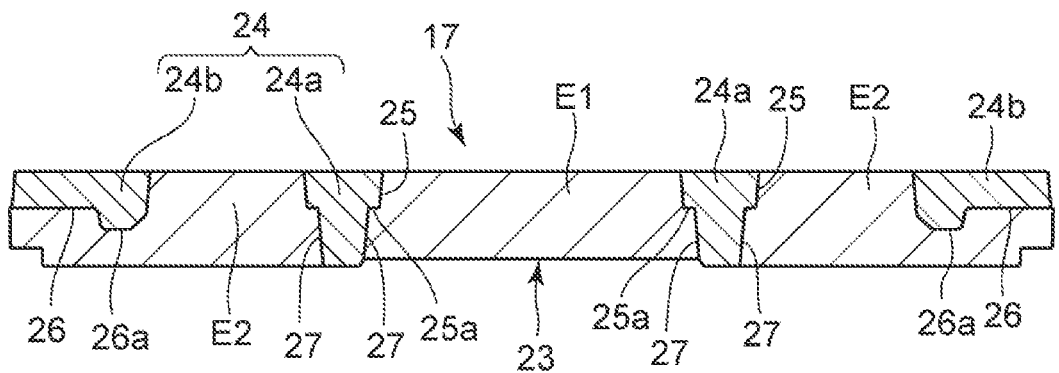
FIG. 7A is an enlarged sectional view of the window member taken along the B-B arrow view shown in FIG. 6.
Figure 7B:
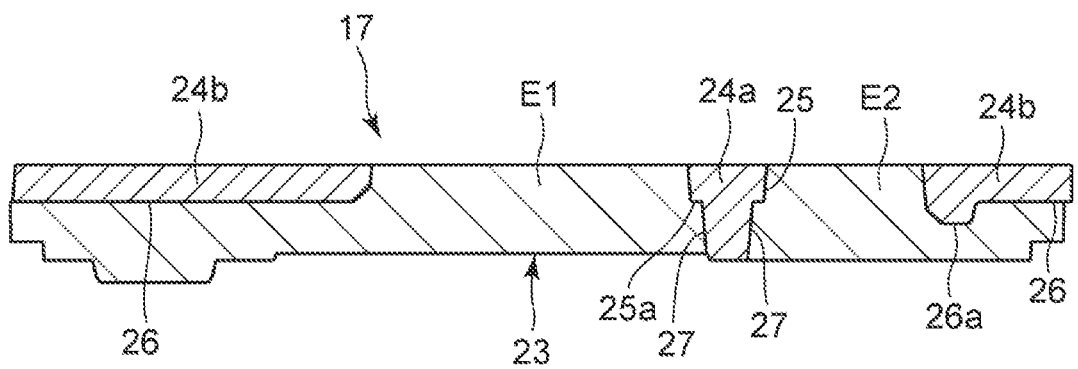
FIG. 7B is an enlarged sectional view of the window member taken along the C-C arrow view shown in FIG. 6.
Figure 7C:
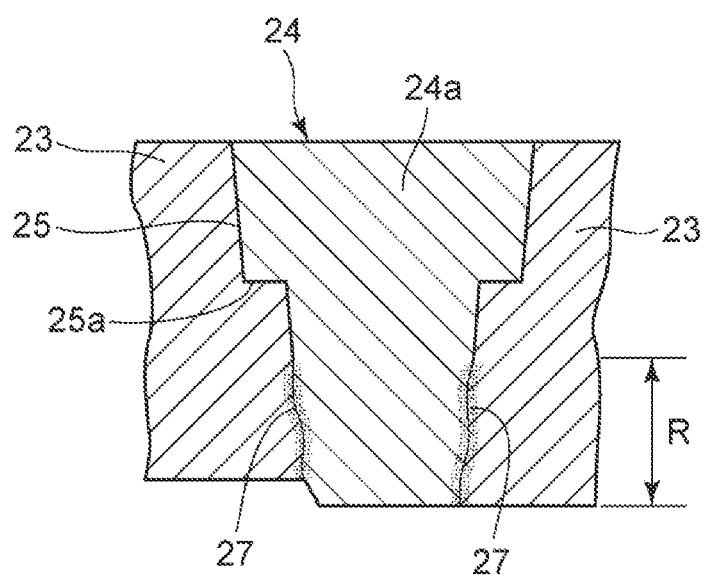
FIG. 7C is an enlarged sectional view showing a partition groove of the window member and a first light blocking section embedded therein.
Figure 8:
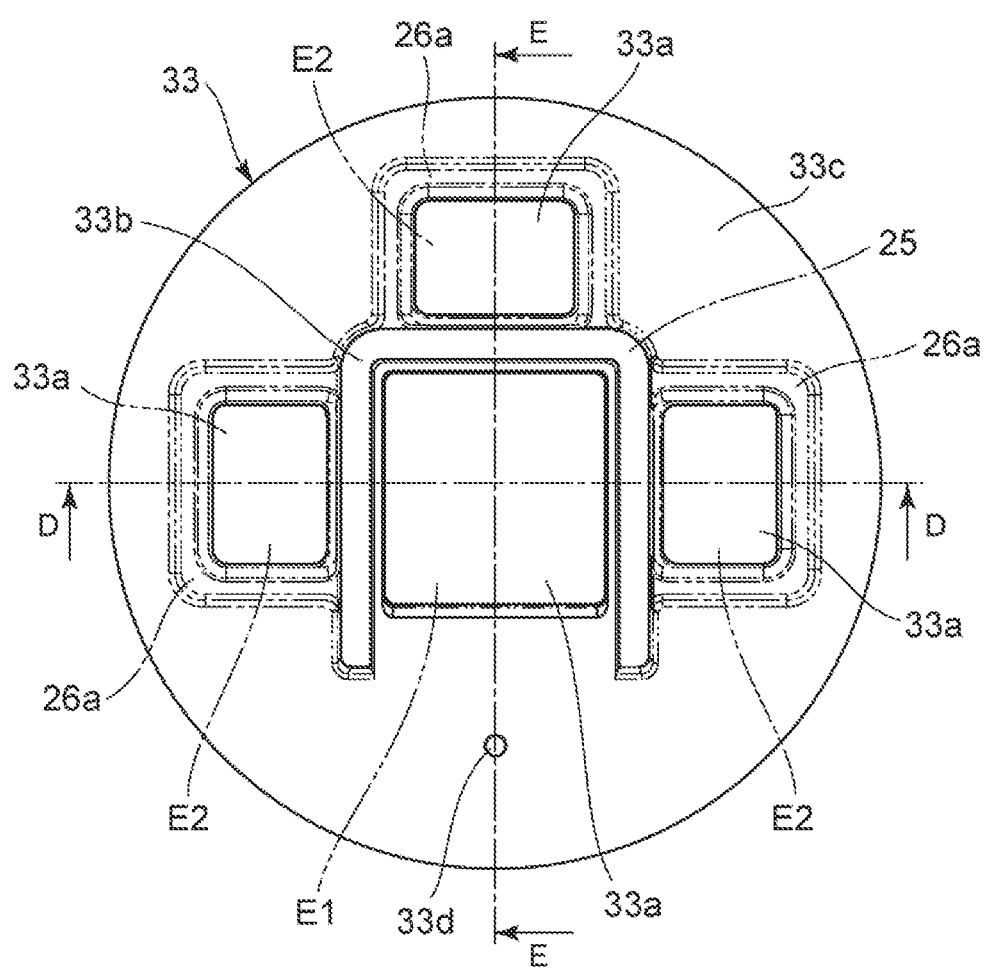
FIG. 8 is an enlarged planar view showing the inner surface of a first upper die of a primary molding die for molding the window member shown in FIG. 6.

The partition groove 25 is provided in areas between the first light transmission area E1 and each of the plurality of second light transmission areas E2, that is, corresponding areas between the light receiving element 20 and each of the plurality of light emitting elements 21, and penetrates in the thickness direction of the resin plate 23, that is, the direction toward the front or back surface of the resin plate 23, as shown in FIG. 7 and FIG. 8. As a result, the partition groove 25 is positioned in corresponding areas between each of the light receiving sections 20a on the three sides of the light receiving element 20 and each of the plurality of light emitting elements 21, that is, the areas between the first light transmission area E1 and each of the plurality of second light transmission areas E2, and thereby has a substantially U-shape extending in the areas excluding one of the four sides of the light receiving element 20.

Also, the partition groove 25 is structured such that opposing surfaces forming this partition groove 25 are inclined at the draft angle of a later-described primary molding die 30 so that its groove width on one surface side of the resin plate 23, or more specifically, its groove width on the outer surface side (upper surface side in FIG. 7) of the resin plate 23 is greater than its groove width on the other surface side of the resin plate 23, that is, the inner surface side (lower surface side in FIG. 7), as shown in FIG. 7A to FIG. 7C.

In this embodiment, on the opposing surfaces forming the partition groove 25, a stepped section 25a is provided so that its groove width on the outer surface side of the resin plate 23 is greater than its groove width on the inner surface side of the resin plate 23, as shown in FIG. 7A to FIG. 7C. This stepped section 25a is to prevent a later-described first light blocking section 24a in the partition groove 25 from rattling in the direction toward the front or back surface of the resin plate 23, that is, rattling in the thickness direction of the resin plate 23.

On the other hand, the partition recess section 26 is provided in a substantially entire area of one surface of the resin plate 23, or more specifically, a substantially entire area of the outer surface of the resin plate 23 excluding the first and second light transmission areas E1 and E2 and the partition groove 25, as shown in FIG. 7 and FIG. 8. This partition recess section 26 is formed such that its depth is about half or one-third of the thickness of the resin plate 23. In this embodiment, in a portion of the partition recess section 26 around the outer peripheries of the plurality of second light transmission areas E2, a boundary recess section 26a slightly deeper than the partition recess section 26 is provided.

The light blocking section 24 is formed of a light blocking resin for blocking light transmission, which is acquired by a black material being mixed into the same material as that of the resin plate 23, that is, a light transmissive synthetic resin such as acrylic resin (PMMA), polycarbonate resin (PC), and ABS resin. This light blocking section 24 includes the above-described first light blocking section 24a that is embedded in the partition groove 25 provided in the resin plate 23, and a second light blocking section 24b that is embedded in the partition recess section 26.

In this embodiment, the first light blocking section 24a embedded in the partition groove 25 is adhered to the resin plate 23 via a welded section 27 formed by the first light blocking section 24a being partially welded at its interface in the partition groove 25, as shown in FIG. 7C. More specifically, the partition groove 25 is filled with a light blocking resin for the light blocking section 24 with the resin plate 23 being heated by the remaining heat of the later-described primary molding die 30, and a portion of the resin plate 23 and a portion of the first light blocking section 24a are welded to each other at an interface therebetween in the partition groove 25, whereby the welded section 27 is formed on the first light blocking section 24a.

This welded section 27 is formed at a position shifted to the inner surface side (lower surface side in FIG. 7C of the resin plate 23 which is opposite to the outer surface side (upper surface side in FIG. 7C. That is, the welded section 27 is formed in an area R which is about one-third of the thickness of the resin plate 23 and located from the inner surface (lower surface) of the resin plate 23 toward the outer surface side (upper surface side), as shown in FIG. 7C. As a result, the welded section 27 firmly fixes the first light blocking section 24a to the inside of the partition groove 25 of the resin plate 23 and thereby ensures waterproofness in the partition groove 25.

Also, the welded section 27 is formed such that, when a portion of the resin plate 23 and a portion of the first light blocking section 24a are to be welded to each other at an interface therebetween in the partition groove 25 after the partition groove 25 is filled with a light blocking synthetic resin for the first light blocking section 24a with the resin plate 23 being heated by the heat of the later-described primary molding die 30, distortion occurs at the interface between the resin plate 23 and the first light blocking section 24a in the partition groove 25, whereby the first light blocking section 24a is further firmly fixed to the resin plate 23, as shown in FIG. 7C.

In this embodiment, the first light blocking section 24a is structured such that, by the stepped section 25a of the partition groove 25, this first light blocking section 24a is not pressed in the thickness direction of the resin plate 23 when the window member 17 is pressed against an arm with the partition groove 25 being filled and the first light blocking section 24a being fixed therein, as shown in FIG. 7A to FIG. 7C. That is, in addition to being structured not to rattle in the thickness direction of the resin plate 23, the first light blocking section 24a is structured such that the positional shifting of the welded section 27 due to the rattling of this first light blocking section 24a in the thickness direction of the resin plate 23 is prevented, whereby the welded section 27 is not cracked.

On the other hand, the second light blocking section 24b embedded in the partition recess section 26 is provided covering the outer surface (upper surface in FIG. 7) of the resin plate 23 excluding the first light transmission area E1, the plurality of second light transmission areas E2, and the first light blocking section 24a, as shown in FIG. 6 and FIG. 7. As a result, the resin plate 23 is structured such that, by the first light blocking section 24a and the second light blocking section 24b, light does not penetrate except for the first light transmission area E1 and the plurality of second light transmission areas E2.

In this embodiment, at the portion of the partition recess section 26 around the outer peripheries of the plurality of second light transmission areas E2, the boundary recess section 26a slightly deeper than the partition recess section 26 is provided, as shown in FIG. 7 and FIG. 8. As a result, the second light blocking section 24b embedded in the partition recess section 26 is further embedded in the boundary recess section 26a of the partition recess section 26. Consequently, the second light blocking section 24b is structured to prevent its portions around the outer peripheries of the plurality of second light transmission areas E2 from being stripped or from having gaps.

Accordingly, the window member 17 is structured such that, when the sensor board 18 is arranged on the inner surface (upper surface in FIG. 3) of the back cover 14 with the window member 17 being attached to the opening section 16 of the back cover 14, one partition 22 provided on the sensor board 18 is pressed against and arranged on the first light blocking section 24a embedded in the partition groove 25 of the resin plate 23, and another partition 22 provided on the sensor board 18 is pressed against and arranged on a portion of the resin plate 23 corresponding to the second light blocking section 24b embedded in the boundary recess section 26a of the partition recess section 26 of the resin plate 23, as shown in FIG. 3.

As a result, the pulse sensor 19 is structured such that, when the plurality of light emitting elements 21 emit light with the device case 1 being worn on an arm and the window member 17 being in close contact with the skin T of the arm (refer to FIG. 4), this light is not directly emitted to the light receiving element 20 by the partitions 22 of the sensor board 18 and the first light blocking section 24a embedded in the partition groove 25 in the resin plate 23 of the window member 17, and emitted to the outside through the plurality of second light transmission areas E2 of the resin plate 23, as shown in FIG. 3.

Also, this pulse sensor 19 is structured such that, when light from the plurality of light emitting elements 21 is emitted to an arm through the plurality of second light transmission areas E2 of the resin plate 23 with the device case 1 being worn on the arm and the window member 17 being in close contact with the skin T of the arm, only reflected light resulting from the emitted light penetrates the first light transmission area E1 and is received by the plurality of light receiving sections 20a of the light receiving element 20, as shown in FIG. 3.

Next, a method for manufacturing the window member 17 is described with reference to FIG. 8 to FIG. 10.

This method for manufacturing the window member 17 includes a first step of molding a primary molded article by using the primary molding die 30, and a second step of molding a secondary molded article by performing, on the primary molded article molded in the first step, secondary molding with a secondary molding die 31.

More specifically, the primary molding die 30 for molding a primary molded article in the first step includes a first lower die 32 and a first upper die 33, as shown in FIG. 8 and FIG. 9. This primary molding die 30 is structured such that, when the first lower die 32 and the first upper die 33 vertically overlap with each other, a first space section 30a is formed therebetween which is called "cavity" and has the same shape as the resin plate 23 that is a primary molded article.

Figure 9A:
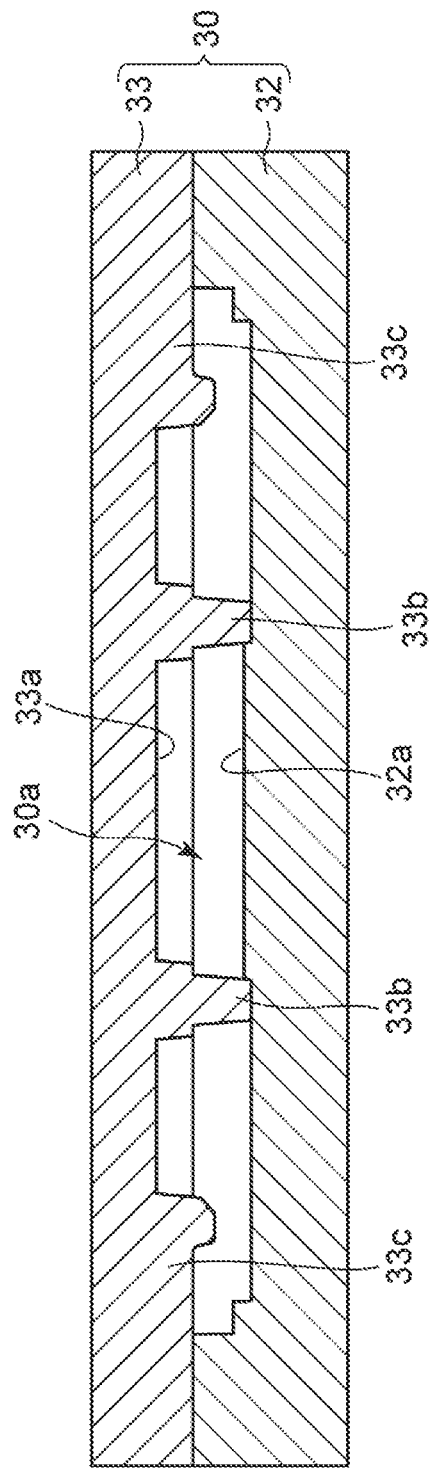
FIG. 9A is an enlarged sectional view of the primary molding die taken along the D-D arrow view shown in FIG. 8.
Figure 9B:
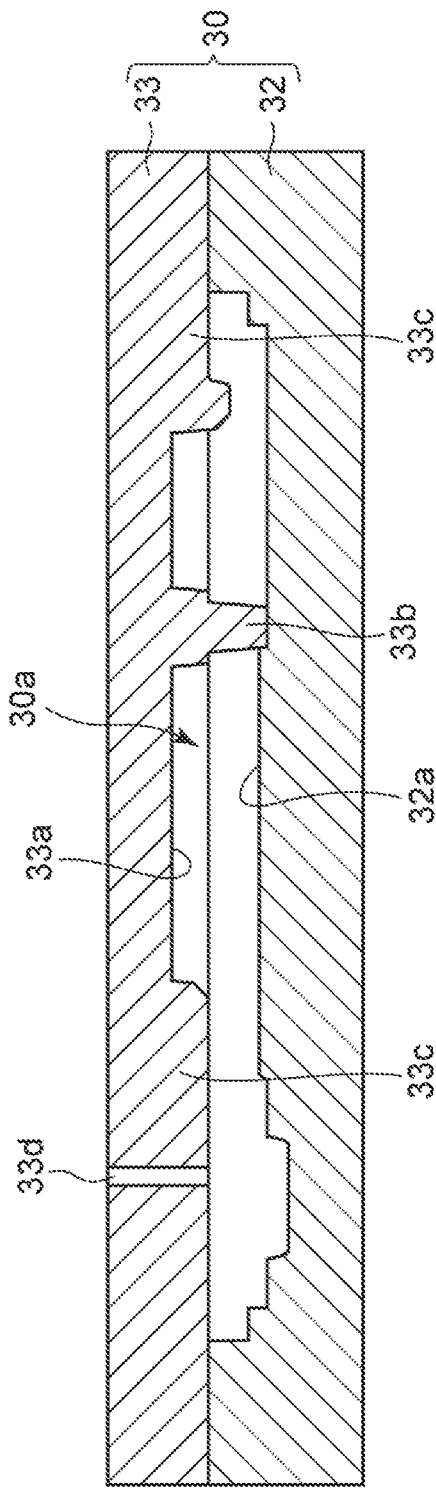
FIG. 9B is an enlarged sectional view of the primary molding die taken along the E-E arrow view shown in FIG. 8.

In this embodiment, the first lower die 32 is provided with a lower die recess section 32a whose depth is substantially half of the thickness of the resin plate 23 and shape is the same as the outer shape of the resin plate 23, as shown in FIG. 9A and FIG. 9B. Also, the first upper die 33 is provided with a first upper die recess section 33a whose depth is substantially half of the thickness of the resin plate 23 and shape corresponds to the first and second light transmission areas E1 and E2, a first projection 33b which forms the partition groove 25 that surrounds the three sides of the first light transmission area E1 of the resin plate 23, and a second projection 33c which forms the partition recess section 26 that surrounds the first light transmission area E1 and the plurality of second light transmission areas E2.

As a result, the primary molding die 30 is structured such that, when the first lower die 32 and the first upper die 33 vertically overlap with each other, the first space section 30a, which has the same shape as the resin plate 23 excluding the partition groove 25 and the partition recess section 26 where the light blocking section 24 of the window member 17 is embedded, is formed inside the primary molding die 30, as shown in FIG. 9A and FIG. 9B.

In this state, a light transmissive synthetic resin such as acrylic resin (PMMA), polycarbonate resin (PC), or ABS resin is injected into the first space section 30a through a first gate 33d provided in a portion of the second projection 33c corresponding to one side not provided with the partition groove 25 that surrounds the three sides of the first light transmission area E1, whereby the resin plate 23 as a primary molded article is molded, as shown in FIG. 8 and FIG. 9. As such, in the first step, the resin plate 23 that is a primary molded article is molded.

Next, in the second step, a secondary molded article is molded by secondary molding with the secondary molding die 31 being performed on the resin plate 23 that is a primary molded article. Here, first, the first upper die 33 of the primary molding die 30 is separated from the first lower die 32, whereby only the first upper die 33 is detached with the resin plate 23 that is a primary molded article remaining in the first lower die 32. In this state, a second upper die 34 of the secondary molding die 31 is placed on and overlaps with the first lower die 32.

Figure 10A:
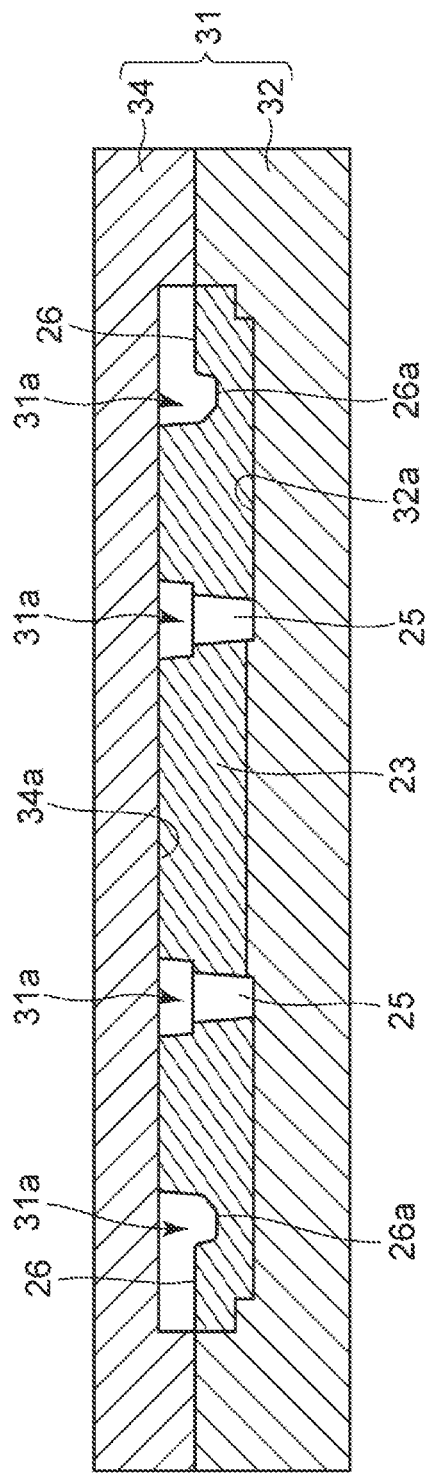
FIG. 10A is an enlarged sectional view of the secondary molding die taken along the B-B arrow view shown in FIG. 6.
Figure 10B:
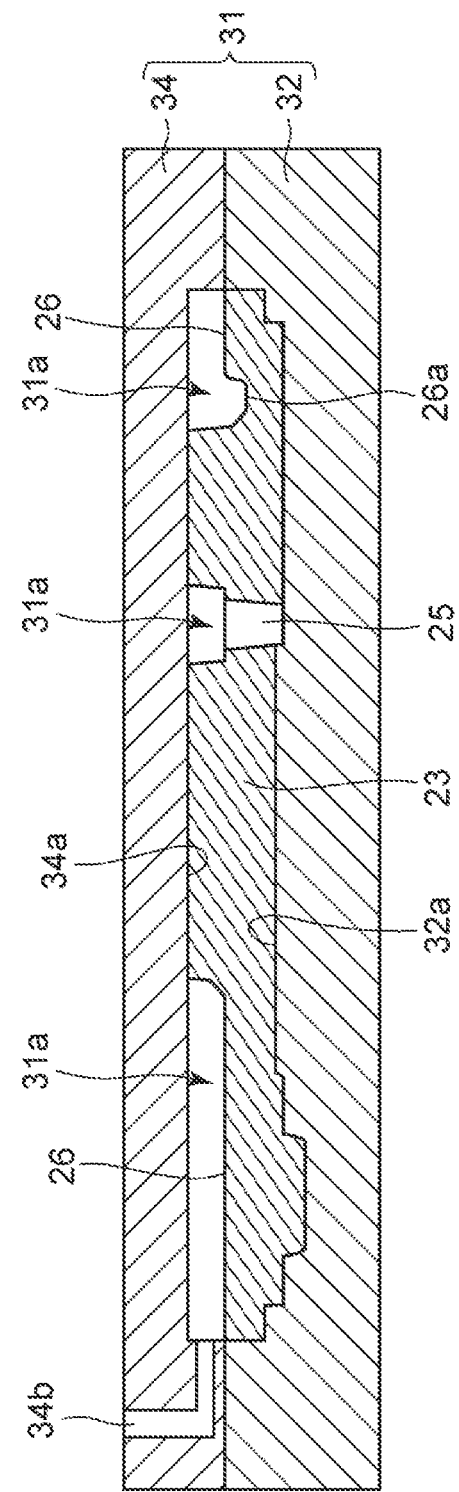
FIG. 10B is an enlarged sectional view of the secondary molding die taken along the C-C arrow view shown in FIG. 6.

That is, the secondary molding die 31 shares the first lower die 32 with the primary molding die 30, as shown in FIG. 10A and FIG. 10B. When the second upper die 34 is placed on and overlaps with the first lower die 32 with the resin plate 23 that is a primary molded article remaining in this shared first lower die 32, a second space section 31a called "cavity" is formed therein. In this embodiment, a second upper recess section 34a is provided in the undersurface of the second upper die 34, which has a flat surface that comes in contact with the upper surface of the resin plate 23, or more specifically, the upper surfaces of the first and second light transmission areas E1 and E2.

As a result, the secondary molding die 31 is structured such that, when the first lower die 32 where the resin plate 23 that is a primary molded article remains overlaps with the second upper die 34 vertically, the second space section 31a, which has the same shape as the partition groove 25 and the partition recess section 26 where the light blocking section 24 of the window member 17 is embedded, is formed inside the secondary molding die 31, as shown in FIG. 10A and FIG. 10B.

In this state, a light blocking resin acquired by a black material being mixed into a light transmissive synthetic resin such as acrylic resin (PMMA), polycarbonate resin (PC), or ABS resin is injected into the second space section 31a through a second gate 34b (refer to FIG. 10B which is a side gate provided in a side wall portion of the second upper die 34 corresponding to an outer circumferential portion of the partition recess section 26 on the upper side of the window member 17 in FIG. 6, whereby the light blocking section 24 is formed in the partition groove 25 of the resin plate 23 and the partition recess section 26.

Here, when the light blocking resin having the black material mixed thereinto is to be injected into the second space section 31a, the resin plate 23 that is a primary molded article has been heated by the remaining heat of the first lower die 32 of the primary molding die 30. Accordingly, a portion of the resin plate 23 and a portion of the first light blocking section 24a injected into the partition groove 25 which is the second space section 31a are welded to each other at an interface between the resin plate 23 and the first light blocking section 24a, whereby the welded section 27 is formed at this interface between the resin plate 23 and the first light blocking section 24a.

That is, the welded section 27 is formed at a position shifted to the inner surface side (lower surface side in FIG. 7C of the resin plate 23 which is opposite to the outer surface side (upper surface side in FIG. 7C. More specifically, the welded section 27 is formed in the area R which is about one-third of the thickness of the resin plate 23 and located from the inner surface of the resin plate 23 toward the outer surface side, as shown in FIG. 7C. As a result, the welded section 27 firmly fixes the first light blocking section 24a to the inside of the partition groove 25 of the resin plate 23, and thereby ensures waterproofness in the partition groove 25.

Also, here, when the first light blocking section 24a is to be formed in the partition groove 25 with the resin plate 23 being heated by the remaining heat of the first lower die 32, the above-described portions of the resin plate 23 and the first light blocking section 24a are welded to each other at the interface between the resin plate 23 and the first light blocking section 24a in the partition groove 25, whereby distortion occurs at the interface between the resin plate 23 and the first light blocking section 24a in the partition groove 25 and, by this distortion, the first light blocking section 24a is further firmly fixed to the resin plate 23, as shown in FIG. 7C.

Moreover, here, the light blocking resin having the black material mixed thereinto is also injected into the partition recess section 26 of the resin plate 23 which is the second space section 31a, whereby the second light blocking section 24b is formed. This second light blocking section 24b formed in the partition recess section 26 is also formed in the boundary recess section 26a slightly deeper than the partition recess section 26. Consequently, portions of the second light blocking section 24b around the outer peripheries of the plurality of second light transmission areas E2 are prevented from being stripped or from having gaps. As a result of this second step, the window member 17 that is a secondary molded article is molded.

Next, a case is described in which the window member 17 is attached to the back cover 14 and the pulse measurement device 13 is mounted on the back cover 14. In this case, the window member 17 is fitted into the lower side of the step portion on the inner circumferential portion of the opening section 16 provided in the circular projection section 15 of the back cover 14. Then, in this state, the outer circumferential portion of the window member 17 is adhered to the inner circumferential portion of the opening section 16 by ultrasonic welding. As a result, the window member 17 is fixed to the opening section 16 of the back cover 14, whereby waterproofing between the window member 17 and the opening section 16 is achieved.

In this state, the pulse measurement device 13 is mounted on the inner surface (upper surface in FIG. 3) of the back cover 14. Here, the pulse sensor 19 is attached to the undersurface of the sensor board 18 in advance. This pulse sensor 19 includes the light receiving element 20 having a substantially square shape and the plurality of light emitting elements 21. When the light receiving element 20 and the plurality of light emitting elements 21 are to be arranged on the undersurface of the sensor board 18, the plurality of light emitting elements 21 are arranged corresponding to the light receiving sections 20a on the three sides of the light receiving element 20 at the predetermined intervals S.

In this state, the light blocking partitions 22 are provided between the light receiving element 20 and each of the plurality of light emitting elements 21 and around the outer peripheries of the plurality of light emitting elements 21. As a result, the light receiving element 20 and the plurality of light emitting elements 21 are surrounded by the partitions 22. Here, the vertical length of each partition 22 is longer than the thicknesses of the light receiving element 20 and the plurality of light emitting elements 21.

Then, the sensor board 18 is arranged on and attached to the inner surface of the back cover 14. Here, the light receiving element 20 of the pulse sensor 19, the plurality of light emitting elements 21, and the partitions 22 are inserted into the upper side of the step portion on the inner circumferential portion of the opening section 16, whereby the light receiving element 20 corresponds to the first light transmission area E1 of the resin plate 23 of the window member 17, the plurality of light emitting elements 21 corresponds to the plurality of second light transmission areas E2 of the resin plate 23, and the partitions 22 correspond to the first light blocking section 24a of the light blocking section 24 embedded in the resin plate 23.

In this state, the sensor board 18 is brought into contact with the inner surface of the back cover 14. As a result, the partitions 22 are brought into contact with the inner end surface of the first light blocking section 24a in the partition groove 25 of the resin plate 23 and with the inner surface of a portion of the resin plate 23 corresponding to the second light blocking section 24b embedded in the boundary recess section 26a of the partition recess section 26 provided in the resin plate 23. Here, since the partitions 22 are vertically longer than the thicknesses of the light receiving element 20 and the plurality of light emitting elements 21, the light receiving element 20 and the plurality of light emitting elements 21 do not come in contact with the inner surface of the window member 17.

As a result of this structure, light emitted by the plurality of light emitting elements 21 of the pulse sensor 19 is blocked by the partitions 22 on the sensor board 18 and the first light blocking section 24a embedded in the partition groove 25 of the resin plate 23, and therefore is not directly emitted to the light receiving sections 20a of the light receiving element 20. Accordingly, light from the plurality of light emitting elements 21 is emitted to the outside only through the plurality of second light transmission areas E2 provided in the resin plate 23 of the window member 17. Also, the light receiving element 20 receives, by the light receiving sections 20a on its three sides, only light that has passed only the first light transmission area E1 of the resin plate 23.

Next, a case is described in which a pulse is measured by the pulse measurement device 13 of this electronic device. In this case, first, the device case 1 is worn on an arm by use of the wristbands 3. As a result, the back cover 14 of the device case 1 is arranged on the arm. Here, since the window member 17 provided in the opening section 16 of the projection section 15 of the back cover 14 is pressed against the arm with the projection section 15 of the back cover 14, the outer surface (lower surface in FIG. 3) of the window member 17 comes in close contact with the skin T of the arm.

When measuring a pulse in this state, first, the plurality of light emitting elements 21 is controlled to simultaneously emit light. As a result, the plurality of light emitting elements 21 emit green light with a wavelength of 520 nm to 530 nm, and this light is emitted to the arm through only the plurality of second light transmission areas E2 of the resin plate 23. Here, by being blocked by the partitions 22 of the sensor board 18 and the first light blocking section 24a embedded in the partition groove 25 of the resin plate 23 of the window member 17, the light from the plurality of light emitting elements 21 is not directly emitted to the light receiving element 20.

When the arm is irradiated with the light emitted by the plurality of light emitting elements 21, the emitted light reflects on the skin T, and this reflected light is received by each light receiving section 20a of the light receiving element 20 through the first light transmission area E1 of the resin plate 23 of the window member 17. More specifically, the light emitted to the skin T reaches blood K in a blood vessel P and is absorbed into hemoglobin H in the blood K because this emitted light is green light with a wavelength of 520 nm to 530 nm.

Accordingly, the amount of reflected light herein varies according to the hemoglobin H in the blood K, which varies the amount of light to be received by the each light receiving section 20a of the light receiving element 20. That is, because the capacity of the blood vessel P varies and the amount of blood K therein varies at the timing of blood vessel P pulsation, the amount of light to be absorbed into hemoglobin H in the blood K varies along with these variations. By the variation of the amount of received light being measured for pulse rate calculation, pulse measurement is achieved.

Here, by being blocked by the partitions 22 on the sensor board 18 and the first light blocking section 24a embedded in the partition groove 25 of the resin plate 23, the light from the plurality of light emitting elements 21 is not directly emitted to the light receiving sections 20a of the light receiving element 20. Accordingly, the light from the plurality of light emitting elements 21 is emitted to the skin T through only the plurality of second light transmission areas E2 provided in the resin plate 23 of the window member 17. Also, as to the reflected light of this light, only light that has passed only the first light transmission area E1 of the resin plate 23 is received by each light receiving section 20a of the light receiving element 20. As a result, the pulse measurement is accurately achieved.

As such, the window member 17 of this electronic device includes the light transmissive resin plate 23 provided with the partition groove 25 which is positioned around part of the outer periphery of the first light transmission area E1 that is a predetermined area and penetrates in the thickness direction, and the first light blocking section 24a which is embedded in the partition groove 25 and fixed to the resin plate 23 by having the welded section 27 at part of the interface in the partition groove 25. As a result, only required light is accurately taken in through the first light transmission area E1. In addition, the first light blocking section 24a is firmly fixed, whereby waterproofness is ensured.

More specifically, in the window member 17 of this electronic device, the partition groove 25 of the resin plate 23 is provided penetrating in the front or back surface direction of the resin plate 23, that is, the thickness direction of the resin plate 23, and the first light blocking section 24a is embedded in the partition groove 25 while penetrating in the thickness direction of the resin plate 23, whereby unnecessary light from outside the first light transmission area E1 is unfailingly blocked by the first light blocking section 24a, and only required light is accurately taken in through the first light transmission area E1.

Also, in the window member 17 of this electronic device, a portion of the first light blocking section 24a embedded in the partition groove 25 and a portion of the resin plate 23 are welded at the interface in the partition groove 25 of the resin plate 23, whereby the welded section 27 is formed. By this welded section 27, the first light blocking section 24a is fixed to the resin plate 23, and waterproofness in the partition groove 25 is ensured.

Also, the window member 17 of this electronic device includes the first light transmission area E1 corresponding to the light receiving element 20, the second light transmission areas E2 corresponding to the light emitting elements 21, the light transmissive resin plate 23 provided with the partition groove 25 which penetrates in the thickness direction at positions between each outer peripheral portion of the first light transmission area E1 corresponding to the light receiving sections 20a of the light receiving element 20 and each outer peripheral portion of the second light transmission areas E2 corresponding thereto, and the first light blocking section 24a which is embedded in the partition groove 25 and fixed to the resin plate 23 by having the welded section 27 at part of the interface in the partition groove 25, whereby light of the light emitting elements 21 which may be directly emitted to the light receiving element 20 is blocked, only required light is accurately taken in through the first light transmission area E1, the first light blocking section 24a is firmly fixed, and waterproofness is ensured.

That is, in the window member 17 of this electronic device, the partition groove 25 is provided which penetrates in the front or back surface direction of the resin plate 23, that is, the thickness direction of the resin plate 23 at positions between each outer peripheral portion of the first light transmission area E1 of the resin plate 23 corresponding to the light receiving element 20 and each outer peripheral portion of the second light transmission areas E2 corresponding to the light emitting elements 21, and the first light blocking section 24a is embedded in this partition groove 25 while penetrating in the thickness direction of the resin plate 23, whereby unnecessary light from outside the first light transmission area E1 is unfailingly blocked by the first light blocking section 24a, and only required light is accurately taken in through the first light transmission area E1.

Moreover, in the window member 17 of this electronic device, the welded section 27 is formed by a portion of the first light blocking section 24a in the partition groove 25 and a portion of the resin plate 23 being welded at the interface in the partition groove 25 of the resin plate 23, whereby the first light blocking section 24a is fixed to the resin plate 23. As a result of this structure, the first light blocking section 24a is firmly fixed in the partition groove 25 of the resin plate 23 and waterproofness in the partition groove 25 is ensured.

In the case of this window member 17, the plurality of second light transmission areas E2 are provided corresponding to plural outer peripheral portions of the first light transmission area E1 which correspond to the plurality of light receiving sections 20a provided on the light receiving element 20. As a result, light from the plurality of light emitting elements 21 is emitted through these second light transmission areas E2 toward the outside of the window member 17, and reflected light resulting from this emitted light is accurately taken in through the first light transmission area E1 and favorably received by the plurality of light receiving sections 20a of the light receiving element 20.

That is, in this window member 17, the light receiving element 20 is formed in a substantially square shape, the light receiving sections 20a are provided on three sides of this substantially square shape, and the plurality of light emitting elements 21 is arranged corresponding to these light receiving sections 20a on the three sides at predetermined intervals S, whereby the plurality of second light transmission areas E2 corresponding to the plurality of light emitting elements 21 is arranged corresponding to three sides of the first light transmission area E1 corresponding to the light receiving element 20. As a result, light emitted by the plurality of light emitting elements 21 penetrates the plurality of second light transmission areas E2, and reflected light resulting from this light is accurately taken in through the first light transmission area E1 and reliably and favorably received by each light receiving section 20a of the light receiving element 20.

In this embodiment, the plurality of light emitting elements 21 is provided on the sensor board 18 while opposing the light receiving sections 20a on the three sides of the light receiving element 20 at the predetermined intervals S. As a result, the light receiving rates of the light receiving sections 20a when the plurality of light emitting elements 21 simultaneously emits light to an arm and the reflected light of this emitted light is received by the light receiving sections 20a of the light receiving element 20 are equalized, so that pulse measurement is accurately performed.

Also, in this window member 17, the welded section 27 is formed at a position shifted to one surface side, or more specifically, the inner surface side of the resin plate 23 which is opposite to the outer surface side, that is, the other surface side, whereby the first light blocking section 24a embedded in the partition groove 25 and the resin plate 23 are easily and favorably welded to each other at the interface in the partition groove 25 of the resin plate 23.

That is, in the case of this window member 17, when the light blocking section 24 is to be molded and embedded in the resin plate 23 by use of the secondary molding die 31, the first light blocking section 24a is molded with the resin plate 23 being heated by remaining heat of the first lower die 32 of the secondary molding die 31, whereby the resin plate 23 and the first light blocking section 24a are easily and favorably welded to each other at the interface in the partition groove 25 of the resin plate 23.

Here, in the case of this window member 17, the portion of the resin plate 23 which is heated by the remaining heat of the first lower die 32 of the secondary molding die 31 is on the inner surface side of the resin plate 23 which is opposite to the outer surface side. Accordingly, the above-described area R is welded which is about one-third of the thickness of the resin plate 23 and located from the inner surface of the resin plate 23 toward the outer surface side, whereby the welded section 27 is formed. By this welded section 27, the first light blocking section 24a is firmly fixed in the partition groove 25 of the resin plate 23, and waterproofness in the partition groove 25 is ensured.

Moreover, this welded section 27 has distortion occurred at the interface between the resin plate 23 and the first light blocking section 24a in the partition groove 25. By this distortion, the first light blocking section 24a is further firmly fixed in the partition groove 25 of the resin plate 23, and waterproofness in the partition groove 25 is ensured.

That is, in the case of this window member 17, when the resin plate 23 and the first light blocking section 24a are welded to each other at the interface in the partition groove 25 of the resin plate 23 with the resin plate 23 being heated by the remaining heat of the first lower die 32 in the secondary molding die 31, distortion occurs at the interface between the resin plate 23 and the first light blocking section 24a. By this distortion, the first light blocking section 24a is further firmly fixed in the partition groove 25 of the resin plate 23, and waterproofness in the partition groove 25 is ensured.

Also, in this window member 17, the partition groove 25 of the resin plate 23 is structured such that the opposing surfaces forming this partition groove 25 are inclined at the draft angle so that its groove width on one surface side of the resin plate 23, or more specifically, its groove width on the outer surface side of the resin plate 23 is greater than its groove width on the inner surface side of the resin plate 23, that is, the other surface side. Accordingly, even though the first projection 33b which forms the partition groove 25 is present on the first upper die 33, this first projection 33b can be favorably pulled out from the resin plate 23 by the use of the inclination at the draft angle when the resin plate 23 is molded in the primary molding die 30 and the dies are separated from each other. As a result of this structure, the dies of the primary molding die 30 are smoothly and favorably separated from each other.

Moreover, in this window member 17, the stepped section 25a is formed on the opposing surfaces of the partition groove 25. As a result, after being embedded in the partition groove 25, the first light blocking section 24a is not pressed in the thickness direction of the resin plate 23 by being received by the stepped section 25a of the partition groove 25.

Accordingly, in this window member 17, the first light blocking section 24a does not rattle in the thickness direction of the resin plate 23 by the stepped section 25a of the partition groove 25, whereby the positional shifting of the welded section 27 due to the rattling of the first light blocking section 24a in the thickness direction of the resin plate 23 is prevented and the welded section 27 is not cracked.

Also, the method for manufacturing this window member 17 includes the first step of molding, by use of the primary molding die 30, the light transmissive resin plate 23 provided with the partition groove 25 which is positioned around part of the outer periphery of the first light transmission area E1 and penetrates in the thickness direction, and the second step of embedding the first light blocking section 24a in the partition groove 25 by use of the secondary molding die 31, and fixing the first light blocking section 24a to the resin plate 23 by providing the welded section 27 formed by a portion of the first light blocking section 24a and a portion of the resin plate 23 at an interface in the partition groove 25 being welded to each other. As a result, the window member 17 is favorably manufactured.

That is, in the manufacturing method for this window member 17, when the resin plate 23 is to be molded by use of the primary molding die 30 in the first step, the first lower die 32 and first upper die 33 of the primary molding die 30 are arranged to overlap with each other such that the first projection 33b and second projection 33c of the first upper die 33 are arranged in the lower die recess section 32a of the first lower die 32, whereby the first space section 30a which is called "cavity" and has the same shape as the resin plate 23 excluding the partition groove 25 and the partition recess section 26 is formed in the primary molding die 30 and, by a light transmissive resin being injected into the first space section 30a, the resin plate 23 as a primary molded article is favorably molded.

Also, in the manufacturing method for this window member 17, when the above-described secondary molded article is to be molded by use of the secondary molding die 31 in the second step, the second upper die 34 is arranged to overlap with the first lower die 32 with the resin plate 23 that is a primary molded article remaining in the first lower die 32 of the primary molding die 30, and the first and second light transmission areas E1 and E2 of the resin plate 23 are arranged in the second upper recess section 34a of the second upper die 34, whereby the second space section 31a which is called "cavity" and has the same shape as the partition groove 25 and the partition recess section 26 is formed and, by a light blocking resin being injected into this second space section 31a, the window member 17 which is a secondary molded article is favorably molded.

In the case of this manufacturing method for the window member 17, the primary molding die 30 and the secondary molding die 31 have the common first lower die 32 so that they can share the first lower die 32. As a result, die manufacturing therefor is simplified and cost reduction is achieved. In addition, when the dies of the primary molding die 30 are to be separated from each other, only the first upper die 33 is required to be separated with the resin plate 23 that is a primary molded article remaining in the first lower die 32, whereby the die separation operation is simplified and therefore the productivity is improved.

Also, in this manufacturing method for the window member 17, in the second step, a portion of the resin plate 23 that is a primary molded article and a portion of the first light blocking section 24a at the interface therebetween are welded to each other by the remaining heat of the shared first lower die 32 of the primary molding die 30, and thereby forms the welded section 27. That is, the resin plate 23 can be heated with the remaining heat of the first lower die 32 when a light blocking resin is injected into the second space section 31a in the secondary molding die 31 so as to form the first light blocking section 24a.

Accordingly, in this manufacturing method for the window member 17, in the second step, a portion of the light blocking resin of the first light blocking section 24a injected into the partition groove 25 of the second space section 31a and a portion of the resin plate 23 at the interface are reliably and favorably welded to each other, whereby the welded section 27 can be favorably formed at part of the interface between the resin plate 23 and the first light blocking section 24a, and distortion can be given to the welded section 27. As a result, the first light blocking section 24a is firmly fixed in the partition groove 25 of the resin plate 23, and waterproofness in the partition groove 25 is ensured.

In the above-described embodiment, the resin plate 23 and the light blocking section 24 are formed using synthetic resins made of the same material. However, the present invention is not limited thereto. For example, the resin plate 23 and the light blocking section 24 may be formed of different synthetic resins made of different materials. In that case, it is preferable that, in the secondary molding, a material whose melting point is higher than that of a material for the primary molding be injected. That is, in a case using the above-described embodiment, the light blocking section 24 should preferably be formed of a material whose melting point is higher than that of the resin plate 23.

As a result, the welded section 27 is easily formed between the light blocking section 24 and the resin plate 23 in the secondary molding. Also, in the present embodiment, the resin plate 23 is formed in the primary molding and the light blocking section 24 is formed in the secondary molding. However, they may be formed in the reverse order. In that method where they are formed in the reverse order, in the case where the resin plate 23 and the light blocking section 24 are formed using different synthetic resins made of different materials, the light blocking section 24 should preferably be formed using a material whose melting point is lower than that of the resin plate 23.

Moreover, in the above-described embodiment, the light receiving element 20 is formed in a substantially square shape, and the light receiving sections 20a are provided on the three sides of this substantially square shape. However, the present invention is not limited thereto. For example, a structure may be adopted in which light receiving sections are provided on two sides of the light receiving element. In addition, a structure may be adopted in which the light receiving element is formed in a polygonal shape such as a pentagonal shape or a hexagonal shape, and light receiving sections are provided on four or more sides thereof.

Furthermore, in the above-described embodiment, the welded section 27 is formed in the area R which is about one-third of the thickness of the resin plate 23 and located from the inner surface of the resin plate 23 toward the outer surface side. However, the range of this area where the welded section 27 is formed may be changed. For example, a structure may be adopted in which the welded section 27 is formed from the inner surface of the resin plate 23 to the stepped section 25a so that rattling can be further prevented and waterproofness can be easily maintained.

Still further, in the above-described embodiment, the present invention has been applied in an arm wearable electronic device. However, the present invention is not necessarily required to be applied in an arm wearable electronic device and may be applied in, for example, an electronic device such as a portable communication device.

While the present invention has been described with reference to the preferred embodiments, it is intended that the invention be not limited by any of the details of the description therein but includes all the embodiments which fall within the scope of the appended claims.

INDUSTRIAL APPLICABILITY

The present invention is capable of providing a window member by which part of light from a light emitting element, which may be directly emitted to a light receiving element, is blocked and a light blocking section is firmly fixed to ensure waterproofness, a method for manufacturing the window member, and an electronic device provided with the window member.

The invention claimed is:

1. A window member, which is arranged at a position that comes in contact with a human body on a wearable device comprising a pulse sensor including a light receiving element and a light emitting element and which seals the wearable device, the window member comprising:
   a first area through which reflected light of irradiation light from the light emitting element to the human body is received by the light receiving element;
   a second area through which the irradiation light from the light emitting element to the human body is transmitted;
   a light transmissive resin plate having a partition groove provided in a thickness direction at a position between an outer peripheral portion of the first area and an outer peripheral portion of the second area; and
   a light blocking section embedded in the partition groove and fixed to the resin plate by having a welded section at part of an interface in the partition groove,
   wherein, in an inner portion of the partition groove, a stepped section is provided so that a groove width of an outer surface side of the resin plate is greater than a groove width of an inner surface side of the resin plate, and
   wherein the welded section is formed only on the inner surface side with respect to the stepped section in the inner portion of the partition groove.

2. The window member according to claim 1, wherein the second area is plurally provided corresponding to a plurality of outer peripheral portions of the first area corresponding to a plurality of light receiving sections provided on the light receiving element.

3. The window member according to claim 1, wherein the welded section has distortion occurred at the interface between the resin plate and the light blocking section in the partition groove.

4. The window member according to claim 1, wherein, in the partition groove, the inner portion of the partition groove is inclined.

5. The window member according to claim 1, wherein melting point of the light blocking section is higher than melting point of the resin plate.

6. The window member according to claim 1, which forms part of an electronic device.

7. The window member according to claim 1, wherein a surface of the inner portion of the partition groove is inclined so that the groove width of the outer surface side is greater than the groove width of the inner surface side.

8. The window member according to claim 1, wherein distortion of an interface between the resin plate and the light blocking section on a portion of the inner surface side with respect to the stepped section in the inner portion of the partition groove is greater than distortion of an interface between the resin plate and the light blocking section on a portion of the outer surface side with respect to the stepped section in the inner portion of the partition groove.

9. A manufacturing method of a window member, which is arranged at a position that comes in contact with a human body on a wearable device comprising a pulse sensor including a light receiving element and a light emitting element and which seals the wearable device, the manufacturing method comprising:
   a first step of molding, by a primary molding die, a light transmissive resin plate including a first area through which reflected light of irradiation light from the light emitting element to the human body is received by the light receiving element and a second area through which the irradiation light from the light emitting element to the human body is transmitted, and having a partition groove provided in a thickness direction at a position between an outer peripheral portion of the first area and an outer peripheral portion of the second area; and
   a second step of embedding a light blocking section in the partition groove, and fixing the light blocking section to the resin plate by forming a welded section at part of an interface between the light blocking section and the resin plate in the partition groove, by a secondary molding die,
   wherein, in an inner portion of the partition groove, a stepped section is provided so that a groove width of an outer surface side of the resin plate is greater than a groove width of an inner surface side of the resin plate, and
   wherein the welded section is formed only on the inner surface side with respect to the stepped section in the inner portion of the partition groove.

10. The window member manufacturing method according to claim 9, wherein the primary molding die and the secondary molding die share a common lower die, and the welded section is formed by the part of the interface between the light blocking section and the resin plate being melted by remaining heat of the common lower die of the primary molding die in the second step.

11. The window member according to claim 1, wherein a thickness from the inner surface side to the stepped section is greater than a thickness from the outer surface side to the stepped section in the inner portion of the partition groove.

12. The window member manufacturing method according to claim 9, wherein a thickness from the inner surface side to the stepped section is greater than a thickness from the outer surface side to the stepped section in the inner portion of the partition groove.

13. The window member manufacturing method according to claim 9, wherein a surface of the inner portion of the partition groove is inclined so that the groove width of the outer surface side is greater than the groove width of the inner surface side.

14. The window member manufacturing method according to claim 9, wherein distortion of an interface between the resin plate and the light blocking section on a portion of the inner surface side with respect to the stepped section in the inner portion of the partition groove is greater than distortion of an interface between the resin plate and the light blocking section on a portion of the outer surface side with respect to the stepped section in the inner portion of the partition groove.

* * * * *